Patented June 1, 1943

2,320,816

UNITED STATES PATENT OFFICE 2,320,816

AMINOPLAST CONTAINING A HALOGENATED NITRILE

Gaetano F. D'Alelio, Pittsfield, Mass., assignor to General Electric Company, a corporation of New York No Drawing. Application August 9, 1939, Serial No. 289,274

18 Claims. (Cl. 260—70)

This invention relates to new condensation products and to methods of making the same. The invention is concerned more particularly with self-curing aminoplasts, by which are meant heat-convertible resinous condensation products prepared from amino or amido compounds and having the inherent characteristic of curing under heat or under heat and pressure to the insoluble, infusible state without the addition of a curing accelerator or catalyst.

In the production of aminoplasts it has heretofore been common practice in converting such materials to the insoluble, infusible state to incorporate into the condensation product or into the molding composition a latent or an active (direct) curing catalyst. As pointed out more particularly hereafter, this technique and the final products have not been wholly satisfactory.

I have discovered that self-curing aminoplasts can be produced by effecting reaction (condensation) between ingredients comprising a urea, an aliphatic aldehyde, for example formaldehyde, and a halogenated nitrile such as hereafter more particularly identified. The initial condensation may be carried out at normal or at elevated temperatures, in the presence or absence of a condensation catalyst and under alkaline, neutral or acid conditions.

The halogenated nitriles used in practicing this invention are those in which at least one halogen atom is attached to an alpha, beta or gamma carbon atom or to any two or all of such carbon atoms. An example of such a nitrile is chloroacetonitrile, $ClCH_2CN$. These nitriles are capable of reaction with aldehydes and may be considered as being the dehydrated product of the corresponding unsubstituted halogenated amide. For example, chloroacetonitrile is the dehydrated product of chloroacetamide, $ClCH_2CONH_2$.

The urea component may be, for instance, urea ($NH_2CONH_2$) itself; thiourea; iminourea (guanidine); aldehyde-reactable substituted ureas thioureas and iminoureas such as methyl urea, acetyl urea, benzoyl urea, phenyl thiourea, asymmetrical diethyl urea, allyl urea, 2-chloro-allyl urea, ethylidene urea, methylol urea, methylene urea, dicyandiamide, guanylurea, guanylthiourea, biguanidine, aminoguanidine, creatine (guanidine methyl glycine) and guanoline (guanido carbonic ethyl ester). Terms such as "a urea," "urea component" and "urea substance," as used generally herein and in the appended claims, are intended to include within their meaning substances of the kind above mentioned. Other examples of aldehyde-reactable compounds that may be used are creatinine, aminotriazoles, ethylene pseudosulfocarbamide derivatives, sulfohydantoin and aldehyde-reactable triazine derivatives.

In my copending application Serial No. 371,583, filed December 24, 1940, claims are made to compositions comprising a condensation product of ingredients comprising an aminotriazine, an aldehyde and a halogenated nitrile selected from the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles, the said nitriles being members of the halogenated aliphatic series. In my copending application Serial No. 435,344, filed March 19, 1942, claims are made to compositions comprising a condensation product of ingredients comprising an aminotriazole, an aldehyde and a halogenated nitrile such as above mentioned with reference to application Serial No. 371,583. Each of these copending applications is a continuation-in-part of the present application and each is assigned to the same assignee as the present invention.

In producing the new condensation products, which may be described more specifically as co-condensation products, the choice of the aliphatic aldehyde component is dependent largely upon economic considerations and upon the particular properties desired in the finished product. I prefer to use as the aldehydic component formaldehyde or compounds engendering formaldehyde such as paraformaldehyde, hexamethylenetetramine, etc. For some applications I may use, for instance, acetaldehyde, propionaldehyde, butyraldehyde, acrolein, methacrolein, crotonaldehyde, etc., mixtures thereof, or mixtures of formaldehyde (or compounds engendering formaldehyde) with such aliphatic aldehydes. In general the longer the chain of the aliphatic aldehyde, the slower the cure of the resinous condensation product and the softer is the final product.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from imperfections, such as blisters, discolorations, etc. Such imperfections are due usually to localized curing that often occurs in resinous materials of the admixed-catalyst type. As the value of the molded article, especially light-colored articles, is materially influenced by its appearance, it is clear that the discovery of any means for decreasing or eliminating entirely the production of imperfect articles which must be scrapped or sold at reduced price is of considerable commercial importance.

As a result of my invention the difficulties attendant the production of molding compositions comprising aminoplasts of the admixed-catalyst type are avoided. With such compositions there was, despite the most careful precautions, considerable variation in the curing rates of the individual batches. This made difficult the maintenance of production schedules. Considerable variation also was common even among different portions of the same batch of material, as evidenced by the appearance of the cured article.

The resin syrups and molding compositions of this invention may be stored for long periods of time without material alteration. In marked contrast therewith the prior heat-convertible aminoplasts, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and, in general, meet the strength, hardness and other requirements of the particular service application.

In carrying the present invention into effect the condensation reaction between the aliphatic aldehyde and the other components preferably is started under neutral or alkaline conditions. Neutral conditions may be established by neutralizing (if necessary) either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter the solution is treated to eliminate acidic conditions due to acid or acid salts. That is, the mass is neutralized or is made alkaline by adding an alkaline substance. The reaction is then caused to proceed further to produce the self-curing aminoplasts of this invention.

In obtaining the neutral, alkaline or acid conditions above described I may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, monosodium phthalate, etc., or mixtures of acids, of acid salts, or or acids and acid salts.

Various ways may be employed for effecting initial reaction between the components. For example, I may first mix all the reactants and effect condensation between the mixed reactants in the presence or absence of addition agents, as for instance, condensation catalysts, fillers, plasticizers, other natural or synthetic resinous bodies, solvents or diluents, etc. Alternatively, I may add the halogenated nitrile to a partial condensation product of a urea (an amidogen compound) and an aliphatic aldehyde and effect further condensation between the components. Or, I may first condense the halogenated nitrile with an aliphatic aldehyde, add the resulting product to a urea-aliphatic aldehyde partial condensation product and then cause the reaction to proceed further. Or, I may condense or partially condense the halogenated nitrile with a mole excess of an aliphatic aldehyde, add a urea to this condensation product and effect further reaction between the components. Still other ways may be employed in combining the components and in producing the unmodified or modified condensation products of this invention, as will be readily understood by those skilled in the art as the description of the invention proceeds. These condensation reactions may proceed under a wide variety of time, temperature and pressure conditions. The temperature of reaction may vary from room temperature to the reflux temperature of the reactants at reduced, atmospheric or superatmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified or unmodified resinous masses are self-convertible under heat or under heat and pressure to the insoluble infusible state.

Depending upon the particular reactants employed and the particular conditions of reaction, these intermediate condensation products vary from clear, colorless, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositio of adjusted viscosity and concentration. The liquid compositions may be used, for instance, as surface coating materials, in the production of paints, varnishes, lacquers, enamels, etc., for general adhesive applications, as anti-creasing agents, in producing laminated articles and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration.

Example 1

| | Parts by weight |
|---|---|
| Urea | 60.0 |
| Aqueous ammonia (28% solution) | 7.6 |
| Aqueous formaldehyde (37.1% approximately) | 161.0 |
| Sodium hydroxide (in 15 parts of water) | 0.06 |
| Chloroacetonitrile | 0.1 |

The above components were mixed in the order given and heated under reflux for 20 minutes. The resulting clear, hot syrup formed a curing resin on the hot plate at 160° C. The hot syrup was mixed with alpha flock and a small amount of zinc stearate to form a molding composition. The compound was dried at 50° C. for 5½ hours. Under heat and pressure the composition formed molded products of good appearance and good properties.

Example 2

| | Parts by weight |
|---|---|
| Urea | 60.0 |
| Aqueous ammonia (28% solution) | 7.6 |
| Aqueous formaldehyde (37.1% approximately) | 161.0 |
| Sodium hydroxide (in 15 parts water) | 0.06 |
| Chloroacetonitrile | 2.0 |

The above components were mixed in the order given and heated under reflux for 12 minutes. The resulting clear, thick syrup cured rapidly on the hot plate at 150° C., and when cool, formed a clear gel. The gel was dried at 50° C. for approximately 2 hours and was converted under heat and pressure into a clear, molded piece.

Example 3

| | Parts by weight |
|---|---|
| Urea | 60.0 |
| Aqueous ammonia (28% solution) | 7.6 |
| Aqueous formaldehyde (37.1% approximately) | 161.0 |
| Sodium hydroxide (in 15 parts of water) | 0.04 |
| Gamma chorobutyronitrile | 4.0 |

All of the above components with the exception of the chloro-butyronitrile were reacted under reflux for 20 to 30 minutes. To the partial condensation product thus obtained was added the above-stated amount of chloro-butyronitrile, after which the mass was refluxed for an additional 20 minutes to effect condensation between all of the components. The resulting clear, hot syrup was mixed with alpha flock and zinc stearate to form a molding composition. The compound was dried at 50° C. for 3 hours. Molded articles produced from this compound by the application of heat and pressure had good curing properties.

Example 4

| | Parts by weight |
|---|---|
| Urea | 60.0 |
| Aqueous ammonia (28% solution) | 7.6 |
| Aqueous formaldehyde (37.1% approximately) | 161.0 |
| Sodium hydroxide (in 15 parts of water) | 0.06 |
| Gamma chlorobutyronitrile | 2.0 |

The above components were mixed and refluxed 10 minutes. The resulting clear, hot syrup was mixed with alpha flock and a small amount of zinc stearate. The molding composition was then dried at 50° C. for 20 hours. When the compound was molded under heat and pressure good molded articles were obtained.

The use of one part chlorobutyronitrile in the above formulation instead of 2 parts produced a resin which cured slowly on the hot plate at 150° C. This type of resin is especially suitable for making laminated products.

Example 5

| | Parts by weight |
|---|---|
| Urea | 60.0 |
| Aqueous ammonia (28% solution) | 7.6 |
| Aqueous formaldehyde (37.1% approximately) | 161.0 |
| Sodium hydroxide | 0.04 |
| Gamma chlorobutyronitrile | 8.0 |

The above components with the exception of the chlorobutyronitrile were mixed and heated under reflux for 20 to 30 minutes. Zinc stearate and alpha flock were then incorporated into the partial condensation product and the composition was dried at 50° C. An alcoholic solution of the above stated amount of chlorobutyronitrile was added to the dried compound. The alcohol-moist compound was heated first at 50° C. and later at 100° C. to effect further condensation between all of the components. This molding composition cured rapidly under heat and pressure to a hardened state, yielding molded articles of good characteristics.

Example 6

| | Parts by weight |
|---|---|
| Urea | 60.0 |
| Aqueous formaldehyde (37.1% approximately) | 161.0 |
| Gamma chlorobutyronitrile | 1.0 |

The above components were mixed and heated to boiling and the reaction allowed to proceed from its own heat of reaction. The resin syrup was mixed with alpha flock and zinc stearate to form a molding composition. The compound was dried at 50° C. for 4 hours and 40 minutes. The molded articles produced from this compound under heat and pressure had good properties.

Condensation products of urea and formaldehyde alone, prepared as described under Examples 1–5, inclusive, but not inter-condensed with the specific halogenated acetonitrile and butyronitrile mentioned in the individual example are heat-non-convertible. In other words, they will not cure under heat or under heat and pressure to the insoluble infusible state.

It will be understood, of course, that the halogenated nitriles mentioned in the above examples are only by way of illustration and that various other halogenated nitriles may be used in carrying this invention into effect. Thus, in addition to the halogenated nitriles given in these examples, I may use any other alpha halogenated nitrile, beta halogenated nitrile, gamma halogenated nitrile, alpha beta halogenated nitrile, alpha gamma halogenated nitrile, beta gamma halogenated nitrile, or alpha beta gamma halogenated nitrile. I mention below numerous examples of such halogenated nitriles, any of which may be used in practicing this invention:

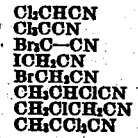
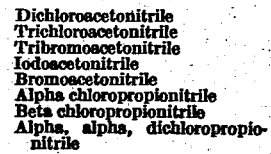

Dichloroacetonitrile
Trichloroacetonitrile
Tribromoacetonitrile
Iodoacetonitrile
Bromoacetonitrile
Alpha chloropropionitrile
Beta chloropropionitrile
Alpha, alpha, dichloropropionitrile

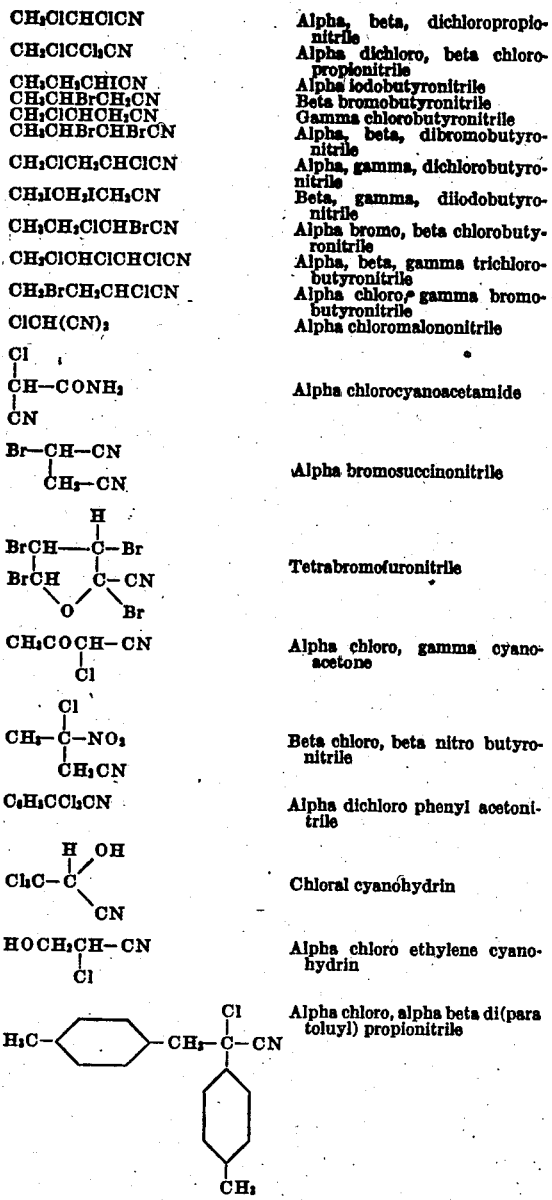

When high boiling halogenated nitriles are added to a partially condensed urea-formaldehyde syrup and not refluxed but are heated to effect drying simultaneously with further condensation, good self-curing resins are obtained. When low boiling halogenated nitriles are used in this way the halogenated nitrile tends to distill off before the condensation reaction is complete. In practicing my invention I prefer, because of economic factors, to use in large part low boiling halogenated nitriles such as chloroacetonitrile or gamma chlorobutyronitrile. Therefore it is desirable that these compounds be condensed into the resin mass by refluxing.

These halogenated nitriles are stable bodies. They may be distilled without decomposition and do not break down by pyrolysis under temperatures used in the condensation reaction.

It will also be understood that in each of the specific halogenated nitriles above mentioned the particular halogen shown in any specific formula may be replaced by some other halogen, care being taken in the choice of the halogen in the light of the properties desired in the final products. For example, when light-colored molded articles are desired, the use of iodonitriles should be avoided and when the heat-convertible resins are to be used in the production of molding compositions, the fluoronitriles preferably are avoided.

Where a plurality of halogen atoms are present in the nitrile molecule, these may be the same or different. For example, one halogen in the molecule may be chlorine and another bromine. In this way it is possible to obtain a heat-convertible resin of self-curing characteristics and other properties best adapted to meet a particular molding problem and service application of the finished article.

In certain cases, it may be advantageous to use a single halogenated nitrile with a plurality of urea substances. Thus, to modify the characteristics of the molded product I may use a mixture of, for example, a thiourea and a triazine derivative, or urea and dicyandiamide, with a single halogenated nitrile. In other cases, instead of using a single halogenated nitrile, I may use a plurality of halogenated nitriles with a single urea substance or with a plurality of urea substances.

The ratio of the reactants to each other may be considerably varied, but, in general, it is desirable to use at least one mole of an aliphatic aldehyde for each mole of urea substance. In producing the heat-convertible resinous condensation products of this invention, the proportion of halogenated nitrile in all cases is at least sufficient to impart self-curing characteristics to the resin. Ordinarily not exceeding substantially ¼ mole halogenated nitrile is used for each mole of urea substance. No advantage accrues from using an amount of halogenated nitrile above the minimum required to secure the desired curing rate. Further, the use of higher amounts of halogenated nitrile is undesirable for most molding applications because of the greater difficulty in obtaining molded articles of suitable hardness, but may not be objectionable for other applications of the material. Also, in some cases, particularly where high molecular weight halogenated nitriles, as for example, alpha chlorostearyl nitrile are used, the nitrile portion of the resin molecule exceeds on a weight basis the urea portion of the molecule. Consequently, in such cases the inherent characteristics (for example, waxy nature) of the high molecular weight halogenated nitrile predominate in the resin molecule. This may be objectionable in some applications of the molded part, for example where resistance to the ordinary organic solvents is required.

From the foregoing it will be seen that the particular mole ratio of halogenated nitrile to the other components is dependent somewhat upon the inherent characteristics of the halogenated nitrile and the curing characteristics and other properties desired in the heat-convertible and heat-hardened resinous condensation products. For molding applications the ratio of the aliphatic aldehyde to urea substance may be considerably varied, but generally will be within the range of 1½ to 2½ moles aliphatic aldehyde for each mole of urea substance. No particular advantage ordinarily accrues from the use of higher amounts of aldehyde. Approximately 2 moles aliphatic aldehyde per mole urea substance usually gives very satisfactory results, particularly from the viewpoint of optimum yields of condensation product per unit cost.

The fundamental resins of this invention may be varied widely by introducing other modifying bodies before, during or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, trimethylol nitro methane, etc.; monoamides such as formamide, acetamide, stearamide, acrylic acid amides (acryloamides), benzamide, toluene sulfonamide, etc.; polyamides such as adipic diamide, phthalamide and the like; amines such as ethylene diamine, aniline, phenylene diamine, amino phenols, etc.

The modifying bodies also may take the form of high molecular weight bodies, with or without resinous characteristics, for example partially hydrolyzed wood products, lignin, proteins, protein-aldehyde condensation products, furfural condensation products, phenol-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the super-polyamides, etc.

Other modifying agents of a plasticizing or softening nature also may be incorporated with the condensation products of this invention. Examples of such modifying agents are the phthalate esters, for instance dimethyl phthalate, diethyl phthalate, dibutyl phthalate, etc., the phosphate esters such as tricresyl phosphate, triphenyl phosphate, etc.

Dyes, pigments and opacifiers (e. g., barium sulfate, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example, the stearates and palmitates of tin, zinc, etc., waxes such as carnauba, high melting point paraffin waxes, etc., may be added to facilitate molding of the compositions. The choice of the filler depends upon the particular application for which the molded article is to be used. As fillers may be used, for instance, bleached or unbleached wood flour, alpha cellulose in flock form, sheets or cuttings of paper, cloth, canvas, etc., asbestos in powdered or long or short fiber length, powdered or flaked mica, wood chips, short or long wood fibers, synthetic or natural continuous threaded fibers, glass fibers in continuous filament or fabric (woven or felted) form, etc.

In the preparation of molding compositions from the resinous bodies of this invention, the non-dehydrated or the partially dehydrated resins may be compounded with the above additional agents in accordance with procedures well known to those skilled in the plastics art. The wet composition may be dried in the usual manner either at normal (room) temperature or at elevated temperatures in a preheated stream of air or under the influence of reflected heat energy. The dried compound may be densified through the usual processes of working in a Banbury mixer, or by rolling, pelleting or other means, followed by grinding and screening to the desired particle size. These molding compositions may be molded at elevated temperatures, preferably between 100° and 150° C., and at suitable pressures. The molding pressures generally range between about 1000 and about 4000 pounds per square inch, more particularly from about 2000 to 3000 pounds per square inch.

In addition to their use in molding compositions, the condensation products of this invention are especially suitable for use as fire retardants, water repellents and sizings when applied to wood or the like, or to fibrous materials such as silk, cotton, wool, synthetic organic fibers, etc., in continuous filament, thread, fabric or other form. It will be understood, of course, that optimum resistance to water, fire, solvents, etc., is obtained only when the applied coating or sizing is converted to the insoluble infusible (cured) state. The cellulosic or other fibrous materials to be treated may be surface coated or both coated and impregnated by any suitable means, for example by spraying with, or immersing in, a solution of the treating agent and thereafter removing the solvent.

The modified or unmodified products of this invention have a wide variety of other uses, for instance in making buttons, clock cases, radio cabinets, dishes and other household utensils, decorative novelties and various other cast, molded and laminated articles of manufacture. They may be used in making arc-extinguishing tubes capable of evolving an arc-extinguishing gas under the heat of the arc, in the production of wire or baking enamels, and for bonding or cementing together mica flakes to form a laminated mica article. They also may be used in making laminated fibrous sheet materials wherein superposed layers of cloth, paper, etc., are firmly bonded together with the resin, as impregnants for electrical coils and other electrical devices, and for other purposes.

What I claim as new and desire to secure by Letters Patent of the United States is:

1. A composition of matter comprising the condensation product of a mixture comprising a urea, an aliphatic aldehyde and at least one halogenated nitrile selected from the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles.

2. A composition of matter comprising an alcohol-modified condensation product of a urea, an aliphatic aldehyde and at least one halogenated nitrile selected from the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles.

3. A heat-convertible resinous condensation product of a mixture comprising a urea, an aliphatic aldehyde and a halogenated nitrile of the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles, the proportion of the said halogenated nitrile being sufficient to yield a self-curing resinous condensation product.

4. A heat-curable resinous composition comprising a soluble, fusible condensation product of ingredients comprising the following components in the stated molar ratios: 1 mole of a urea, at least 1 mole of formaldehyde and not exceeding substantially ¼ mole of a halogenated nitrile of the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles.

5. A product comprising the cured resinous condensation product of claim 3.

6. A condensation product of a mixture comprising a urea, an aliphatic aldehyde and chloroacetonitrile.

7. A condensation product of a mixture comprising a urea, an aliphatic aldehyde and gamma chlorobutyronitrile.

8. A molding composition comprising a heat-hardenable resinous condensation product of a mixture comprising urea, formaldehyde and halogenated acetonitrile.

9. A molding composition comprising a filler and a soluble, fusible resinous condensation product of ingredients comprising the following components in the stated molar ratios: 1 mole urea, at least 1 mole formaldehyde and not exceeding substantially ¼ mole chloroacetonitrile.

10. An article of manufacture comprising the heat- and pressure-hardened molding composition of claim 8.

11. A product comprising the cured resinous composition of claim 4.

12. The method of producing a self-curing aminoplast which comprises reacting to resin formation ingredients comprising the following components in the stated molar ratios: 1 mole of a urea, at least 1 mole of an aliphatic aldehyde and not exceeding substantially ¼ mole of a halogenated nitrile of the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles.

13. A composition of matter comprising a soluble, fusible aminoplast intercondensed with a halogenated nitrile selected from the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles.

14. The method of preparing new condensation products which comprises effecting reaction between ingredients comprising a urea, an aliphatic aldehyde and a halogenated nitrile selected from the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles.

15. A resinous condensation product obtained by reaction of a mixture comprising (1) a halogenated acetonitrile and (2) an alkaline-catalyzed partial condensation product of ingredients comprising a urea and formaldehyde.

16. A resinous condensation product obtained by reaction of a mixture comprising (1) a chlorinated acetonitrile and (2) a product of partial condensation of ingredients comprising urea and formaldehyde while admixed with a small amount of alkaline material comprising ammonia and sodium hydroxide.

17. A composition of matter comprising a soluble, fusible aminoplast intercondensed with a halogenated acetonitrile.

18. A composition of matter comprising a soluble, fusible aminoplast intercondensed with a chlorinated acetonitrile.

GAETANO F. D'ALELIO.